May 5, 1970     E. W. SWENSON     3,510,066

SPREADER APPARATUS

Filed March 10, 1966     2 Sheets-Sheet 1

Inventor
Eskil W. Swenson
By
McCanna, Mausbach & Pillote
Attorneys

May 5, 1970   E. W. SWENSON   3,510,066
SPREADER APPARATUS
Filed March 10, 1966   2 Sheets-Sheet 2
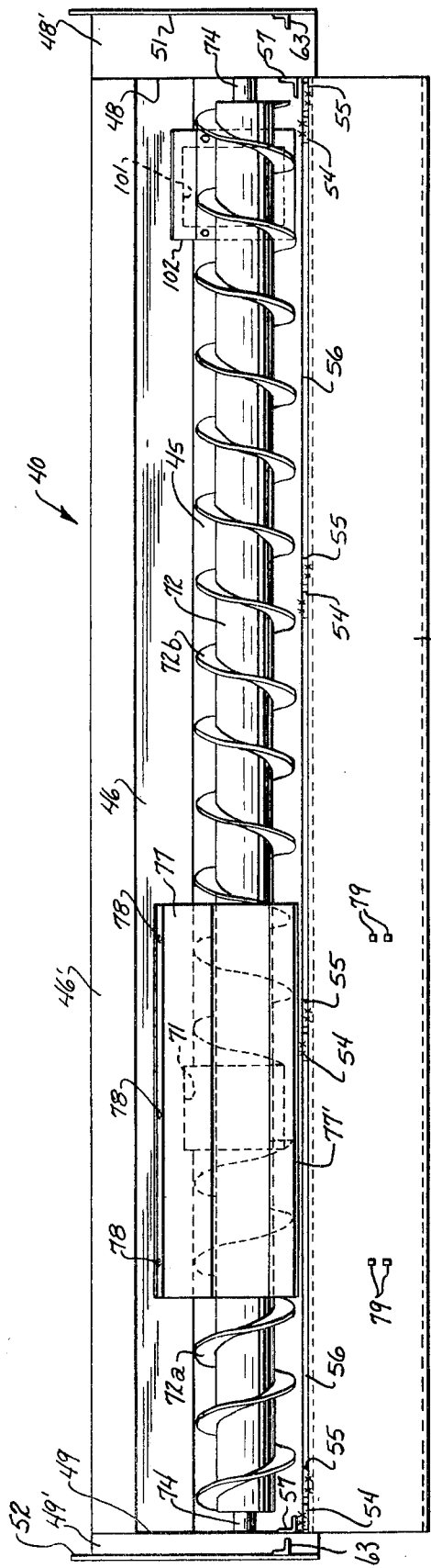
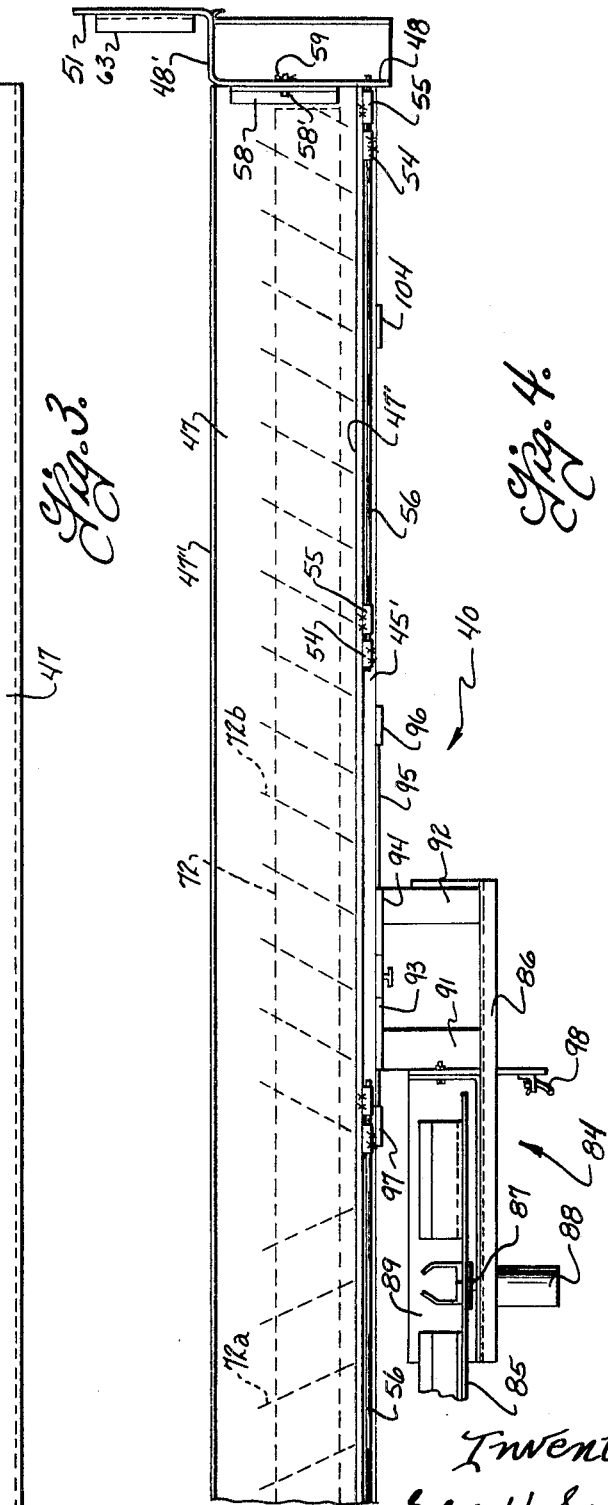
Inventor
Eskil W. Swenson
By McCanna, Morsbach & Pillote
Attorneys United States Patent Office 3,510,066
Patented May 5, 1970

3,510,066
SPREADER APPARATUS
Eskil W. Swenson, Cherry Valley, Ill., assignor to Swenson Spreader & Mfg. Co., Lindenwood, Del., a corporation of Illinois
Filed Mar. 10, 1966, Ser. No. 533,325
Int. Cl. A01c 3/06
U.S. Cl. 239—657                                22 Claims

ABSTRACT OF THE DISCLOSURE

A trough or hopper extends along the rear end of a dump box to receive material therefrom. An auger in the hopper feeds material through a discharge opening onto a spinner. A combination cover and backplate overlies the hopper in one position and is movable to another position to guide material into the hopper. A feed plate overlies the auger in the area of the discharge opening and is supported on the front and rear walls of the hopper. The rear wall of the hopper is pivotally mounted for movement between a position adjacent the auger and another position for cleaning the hopper and auger.

This invention relates to an improved spreader apparatus and more particularly to such an apparatus for use on a vehicle.

The instant invention constitutes a new and useful improvement in spreader apparatus of the type shown and described in Pat. No. 3,189,355, issued to E. W. Swenson et al.

The aforementioned Swenson et al. patent disclosed a spreader apparatus including a hopper having a discharge opening intermediate its ends, auger means disposed in the hopper, and a feed plate above the discharge opening and in close overlying relation to the auger means. On occasion foreign articles, too large to pass through the spreader, will lodge against the feed plate, or the apparatus may otherwise become clogged. Accordingly, it is an object of this invention to provide a spreader apparatus which is arranged for easy removal of such clogs or foreign articles from the hopper and particularly for easy removal from under and around the feed plate and auger.

The above mentioned Swenson et al. patent also disclosed a spreader apparatus mountable on a dump truck for spreading material from the dump box and which enabled use of the dump truck for hauling and dumping the contents of the box without recovering the spreader apparatus from the truck. This provided an apparatus which could quickly be converted from spreading one material to another material merely by dumping the material from the box over the top of the spreader and augering any material that is in the spreader hopper onto the spinner. Such augering, however, did not always clean all of the material from the spreader hopper. Accordingly, it is an object of this invention to provide an improved spreader apparatus which can be easily cleaned out.

Another object is to provide a spreader apparatus in accordance with the above object which can be cleaned out without moving the auger or spinner.

Other objects and advantages of the present invention will become apparent as the same becomes better understood from the following detailed description when taken in conjunction with the accompanying drawings wherein:

FIG. 3 is a top view of the spreader apparatus taken generally along line 3—3 of FIG. 1 and having parts removed for better illustration; and FIG. 4 is a rear view of the spreader apparatus of FIG. 3 and illustrating the back wall in a moved position.

Reference is now made more particularly to the drawings wherein similar reference characters indicate the same parts throughout the several views.

Figure 1:
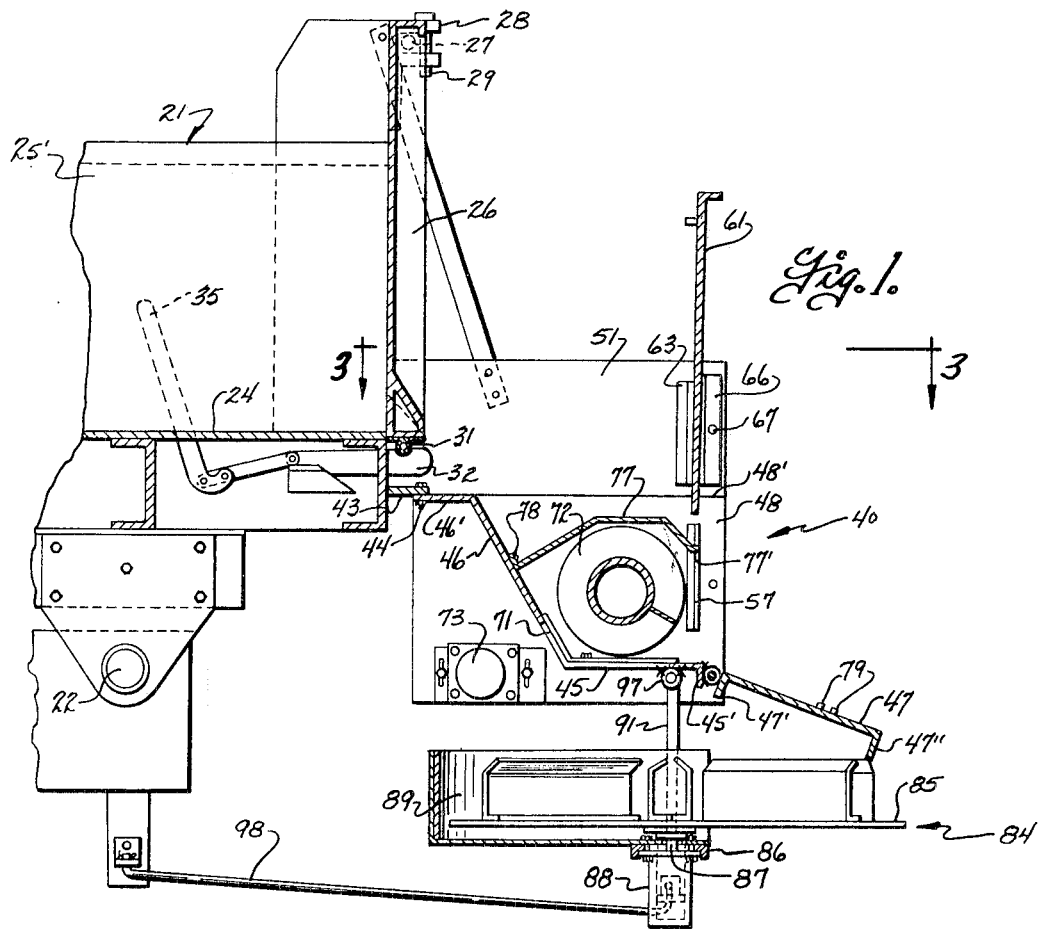
FIG. 1 is a fragmentary sectional view through the spreader apparatus of the present invention and dump box.
Figure 2:
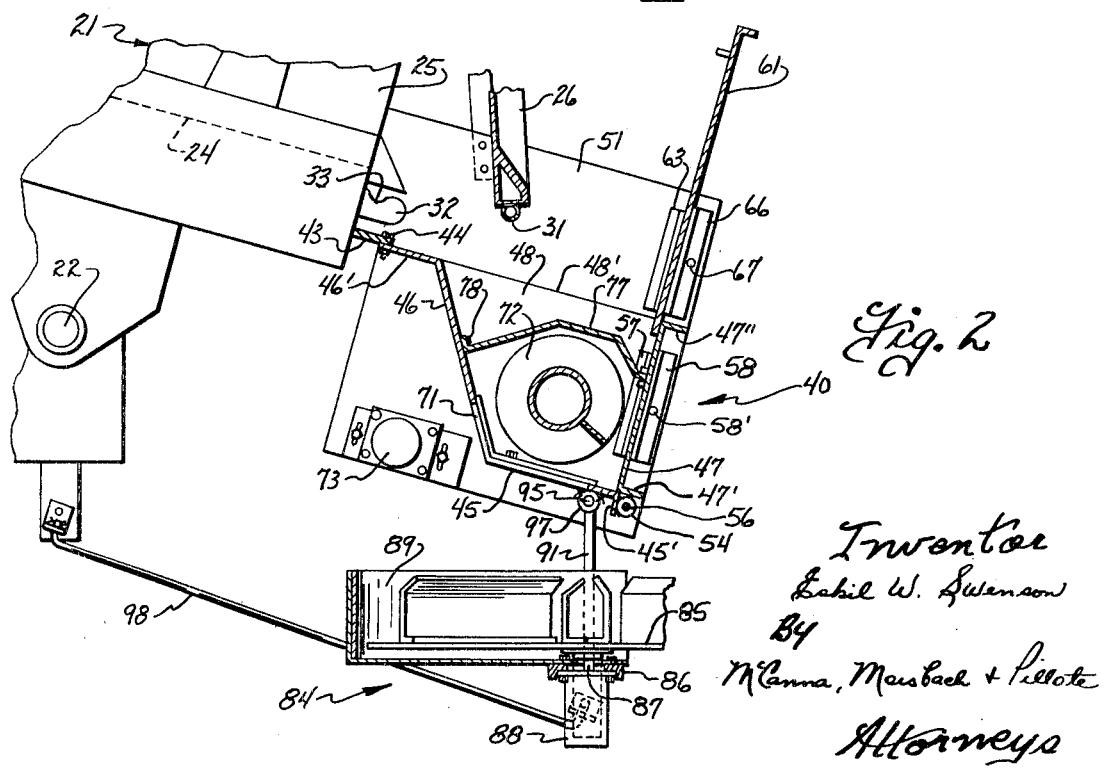
FIG. 2 is a fragmentary sectional view through the spreader apparatus and illustrating the dump box in tilted position for dispensing material to the spreader apparatus.

The spreader apparatus of the present invention is generally adapted for use with vehicles having a storage hopper to spread material therefrom. The embodiment of the apparatus illustrated, however, is particularly designed for use with a dump truck of any conventional construction. The dump truck in general has a material storage means in the form of a dump box 21 which is mounted on the truck for tilting movement relative thereto about an axis 22 extending crosswise of the truck. The dump box itself includes a bottom wall 24, spaced side walls 25, 25' and an end gate 26 which extends across the rear of the box. End gate 26 has trunnions 27 at opposite ends and adjacent the upper edges thereof, and which trunnions are adapted to be swingably supported in yokes 28 on the ends of the side walls. The trunnions 27 are releasably retained in the yokes 28 as by pins 29. The end gate 26 also includes laterally extending trunnions 31 adjacent the lower edge of the end gate, and mechanism is provided on the dump box for releasably engaging the lower trunnions to provide a releasable pivotal support therefor. A convenient mechanism for releasably engaging the trunnions includes a latch 32 having a recess 33 therein for receiving the trunnion 31. A lever 35 is pivotally mounted adjacent the side of the box for moving the latch 32 between its latch and release positions in a conventional manner which is more or less diagrammatically illustrated in FIG. 1. With the above described arrangement, the upper trunnions can be released to allow the end gate or tail gate to swing downwardly about the lower trunnions 31 or, alternatively, the lower trunnions can be released to allow the lower portions of the tail gate to swing outwardly about its upper trunnions as shown in FIG. 2.

The spreader apparatus includes an elongated trough or hopper, generally designated by the numeral 40, arranged to extend across the rear end of the dump box to receive material therefrom. The construction and arrangement of the hopper on the dump box is such that the material from the dump box can either be discharged into the hopper to be spread by the spreader apparatus or, alternatively, the material from the dump box can be discharged over the top of the hopper to enable dumping of the material from the box in the usual manner and without removing the spreader apparatus therefrom. The hopper has a generally U-shaped cross-section and includes a bottom wall 45, and front and rear walls 46 and 47. The front wall has a forwardly extending flange 46' at its upper edge which is attached to a seal strip 43 as by fasteners 44 (FIGS. 1 and 2). The seal strip extends forwardly to engage the rear end of the dump box and prevent discharge of material between the dump box and the forward end of the hopper. Bottom wall 45 has a downwardly extending flange 45' adjacent its rear edge to rigidify the same. Rear wall 47 is generally channel shaped and includes flanges 47' 47" adjacent its lower and upper ends, respectively, and preferably extending in a direction away from the interior portion of the hopper for reasons which will hereinafter become apparent. The rear wall is preferably connected to the bottom wall for swinging movement in a manner hereinafter described. End plates 48 and 49 extend across opposite ends of the hopper and have flanges 48', 49' at their upper edges disposed substantially coplanar with flange 46'. Material guide plates 51 and 52 are secured, as by welding, to the flanges 48' and 49' at opposite ends of the hopper, and which guide plates extend upwardly therefrom.

Rear wall 47 is arranged for movement from one generally upright position closely adjacent the auger and a second position removed therefrom to provide access for cleaning the hopper and auger. In the embodiment illustrated, the rear wall is pivotally connected to bottom wall 45, preferably by hinges mounted on flanges 45' and 47'. A plurality of tubular members 54 are coaxially mounted on bottom wall flange 45', as by welding, and similarly, a plurality of tubular members 55 are mounted on rear wall flange 47'. Elongate hinge pins 56 conveniently interconnect two adjacent pairs of tubular members and provide a hinge connection between the rear and bottom walls. While various different arrangements may be provided for supporting rear wall 47 in its generally upright position shown in FIG. 2, this is conveniently achieved by stop flanges 57 attached to each of the end plates 48, 49, and generally above the rear edge of bottom wall 45. Clamp members 58 (FIGS. 2 and 4), conveniently in the form of angle irons, are provided for engaging the back side of the rear wall to clamp it against the stop flanges. The clamp members 58 are removably attached to the end plates 48, 49, and have a laterally projecting pin 58' which extend through an opening in the respective end plate. A removable fastener 59 (FIG. 4) is provided for releasably retaining the clamp members in position. With this construction, the rear wall can be readily moved from the generally upright position, as shown in FIGS. 2 and 4, to a clean-out position overlying and covering the spinner (FIGS. 1 and 3) by merely removing the clamp member and pivoting the rear wall about the above described hinges.

The hopper is advantageously mounted on the dump box for movement as a unit therewith in any convenient manner, as by securing the material guide plates 51, 52, to the dump box side walls 25, 25'. For this purpose, brace brackets are secured, as by bolting, to the respective side wall and material guide plate. In general, the hopper is positioned with its upper edge disposed at a level below the bottom wall 24 of the dump box sufficient to allow the tail gate 26 to move downwardly at least to position substantially coplanar with the bottom wall. The upper edge of the hopper is defined by flanges 46', 48' and 49' and rear wall flange 47'' is preferably coplanar with said upper edge when the rear wall is in the raised or upright position illustrated in FIG. 2.

A combination cover plate and back plate 61 is preferably provided for the hopper, and which combination plate is movable between a position covering the top of the hopper and a position, such as shown in FIGS. 1 and 2, extending upwardly from the rear edge of the hopper as it is discharged from the dump box. The combination plate 61 is conveniently of similar shape and function as that illustrated in the aforementioned Swenson et al. patent and reference is made thereto for a more complete illustration and description. In general, the ends of the plate are guidably received between the guide plates 51 and 52 to permit sliding of the combination plate into and out of the cover position and the forward corners of the plate are notched at opposite ends to allow the edge of the plate to drop down into the hopper in front of the rear wall 47 when the combination plate is in the position illustrated in FIGS. 1 and 2. While various different arrangements may be provided for supporting the plate 61 in the position shown, this is conveniently achieved by stop flanges 63 attached to each of the guide plates 51 and 52 adjacent the rear wall 47 of the hopper, and which stop flanges are spaced slightly above the top of the hopper to allow the combination plate to slide therebelow. Clamp members 66 conveniently in the form of angle irons, are provided for engaging the combination plate 61 to clamp the same against the stop flanges. The clamp members 66 are removably attached to the guide plates 51 and 52 and, as shown, have a laterally projecting pin 67 which extends through an opening in the respective guide plate. A removable fastener is conveniently provided for releasably retaining the clamp members in position. With the above described construction, the combination plate can be readily removed from the upright position illustrated to a hopper covering position be merely removing the clamp members and dropping the plate 61 down to a position coplanar with the top of the hopper and thereafter sliding the plate forwardly across the top of the hopper. Since the top of the hopper is disposed at a level below the bottom of the dump truck, the tail gate 26 can be swung downwardly to dump material with the tail gate open from the top or, alternatively, the cover can be applied to the hopper and the tail gate opened from the bottom to dump material over the top of the hopper, with the tail gate open from the bottom.

The hopper has a discharge opening 71 in the bottom and front walls thereof and spaced inwardly from opposite ends of the hopper. A feed mechanism is provided for feeding material lengthwise of the hopper to the discharge opening and is herein illustrated as an auger 72 disposed in the hopper in close relationship to the walls thereof. The auger has relatively oppositely directed spiral flights, designated 72a, 72b, which extend from the discharge opening 71 in the hopper toward relatively opposite ends of the hopper and which are arranged to feed material from opposite ends of the hopper toward the feed opening when rotated in a preselected direction. The auger is driven by motor 73, conveniently of the hydraulic type, and rotatably supported in bearings 74 mounted on the end plates 48 and 49 of the hopper (FIG. 3). A feed plate 77 is provided in the hopper above the discharge opening 71 and which feed plate closely overlies the auger 72 to achieve more positive feeding of material to the discharge opening when the auger is rotated.

As can be seen in FIGS. 1 and 2, the feed plate 77 is shaped to closely overlie the auger at the discharge opening 71 and is connected to front wall 46 as by removable fasteners 78. The feed plate extends beyond the ends of the discharge opening 71 a distance sufficient to prevent gravity flow of material from the hopper through the discharge opening (FIG. 3). The plate extends to rear wall 47 and is firmly held in position over the auger. For this purpose the feed plate must be supported at its rear edge. A plurality of fingers 79 are provided on rear wall 47 to hold the feed plate against vertical movement, either toward or away from the auger. The fingers 79 are preferably arranged in pairs adjacent opposite ends of the feed plate, one finger overlying the feed plate and the other underlying the same thereby firmly holding the feed plate in position. In the embodiment illustrated, the fingers are advantageously perpendicular to the rear wall and the portion of the feed plate received therebetween, designated 77', is also advantageously perpendicular to the rear wall for a purpose which will hereinafter become apparent.

A rotary, broadcast-type spreader assembly 84 is provided for spreading material as it is fed from the discharge opening 71. The broadcast-type spreader includes a spinner 85, herein shown in the form of a disk, and which is mounted on a support bracket 86 for rotation about a generally upright axis 87. A hydraulic motor 88 is conveniently provided for rotating the spinner. As best shown in FIGS. 1 and 2, the spinner 85 is mounted on the hopper so that the discharge opening in the hopper overlies only the forward portion of the spinner so that the material is discharged onto the spinner substantially at the front of the center thereof. A shield 89 is conveniently mounted in front of the spinner to prevent forward spreading of material. The spinner is mounted on the hopper to maintain the spinner substantially horizontal as the dump box and hopper are tilted and to permit shifting of the spread pattern as desired. For this purpose, bracket 86 is provided with upwardly extending arms 91 and 92 having spaced sleeves 93 and 94 at their upper ends, as best seen in FIG. 4. The sleeves are slidably and rotatably supported on a rod 95 which is attached to the hopper by tubular brackets 96 and 97. Preferably, the tubular brackets are mounted on the bottom wall 45 adjacent the pivotal connection to the rear wall. Bracket 86 and spinner 85 are therefore free to swing about a generally horizontal axis, and a link 98 is connected to the broadcast spreader and to the truck to maintain the spinner axis generally upright as the dump box and hopper are tilted. The link connections, means for driving the auger, means for driving the spinner and shifting the position thereof, and a convenient control system are described in the aforementioned Swenson et al. patent and reference is made thereto for a more complete description thereof.

The apparatus of the present invention is conveniently convertible from use as above described to a "side dressing" operation, that is, spreading material primarily to the right of the vehicle. For this purpose, a second discharge opening 101 is provided adjacent the right hand end of the auger, as seen in FIG. 3. The second discharge opening is ordinarily covered by a cover plate 102 when the spreader apparatus is used as described above. When used for "side dressing," this cover plate is removed and conveniently re-positioned over discharge opening 71. Feed plate 77 is then removed and repositioned over discharge opening 101 or, alternatively, a separate feed plate may be utilized. Auger 72 is removed and replaced by an auger arranged for feeding material to discharge opening 101 and the spreader assembly 84 is re-positioned adjacent the right side of the hopper. For this purpose, a third tubular bracket 104 is provided as seen in FIG. 4. Rod 95 is re-positioned between tubular brackets 96 and 104 and spinner disk 85 is thereby positioned underneath discharge opening 101. Shield 89 may be reversed in position, or removed altogether if the spinner is operated at a slow enough speed.

From the foregoing, it is thought that the construction and operation of the spreader apparatus will be readily understood. The hopper is mounted directly on the dump box for tilting movement therewith and a combination cover and back plate can be positioned as shown in FIGS. 1 and 2 when the apparatus is to be used for a spreading operation. Since the spreader apparatus may occasionally clog, rear wall 47 is pivotally mounted on the bottom wall of the hopper for movement between a generally upright position as shown in FIG. 2 and a lowered, or clean out, position as shown in FIG. 1. Since clogging occurs when the apparatus is in use, such as on a highway, it is necessary that any clean out operation be performed as quickly and easily as possible. It can be seen that the rear wall 47 may be lowered without removal of the combination plate 61 and that this provides easy access for cleaning material from beneath the auger and feed plate or for removal of any foreign objects from the hopper. Additionally, when changing material in the dump box, the arrangement of the present invention provides a quick and convenient method of removal of the material from the hopper.

While I have thus described a preferred embodiment of my invention, this has been done by way of illustration and not limitation, and I do not wish to be limited except as required.

I claim:

1. A spreader apparatus for use on a vehicle having a dump box mounted thereon for carrying material to be spread and for tilting movement about an axis extending crosswise of the vehicle, and said dump box being generally open at the rear for discharge of the material therefrom, the spreader apparatus including a trough mounted on the vehicle rearwardly of the dump box and at a level to receive the material discharge therefrom, said trough having a front wall and a bottom wall connected thereto and a discharge opening for discharge of material from the trough, said trough also having a rear wall swingably connected to the bottom wall, auger means extending generally the full length of the trough and rotatably mounted closely adjacent said walls for feeding the material through the trough discharge opening, said rear wall being movable between one position closely adjacent the auger means and a second position removed therefrom for cleaning the trough and auger means, and means on the trough for releasably supporting the rear wall in said one position.

2. A spreader apparatus as set forth in claim 1 wherein said discharge opening is in the bottom and front walls, and including a feed plate mounted above the discharge opening in close overlying relation to the auger means and extending between the front and rear walls, said feed plate having a length greater than the discharge opening and substantially less than the length of the bottom wall, first mounting means for connecting the feed plate to the front wall, second mounting means on the rear wall for supporting the feed plate on the rear wall and readily disengageable for swinging movement of the rear wall to the second position, said feed plate operative to confine the material advanced by the auger means whereby the auger means will force the material down through the discharge opening, and means disposed below the discharge opening for spreading material from the trough.

3. A spreader apparatus as set forth in claim 1 wherein: the trough is rigidly mounted on the dump box for tilting movement therewith, the rear wall is hinged to the bottom wall adjacent the rear side thereof, and including a spinner, means mounting the spinner below the discharge opening for rotation about a generally upright axis and including a mounting bracket supporting the spinner and connected to the bottom wall adjacent the rear wall hinge connection for swinging movement in a direction parallel to the length of the vehicle, and means connected to the mounting bracket and to the vehicle for maintaining the spinner generally upright as the dump box and trough are tilted.

4. A spreader apparatus as set forth in claim 2 wherein the rear wall is hinged to the bottom wall, and the second mounting means includes at least one pair of vertically spaced fingers on the rear wall for receiving the feed plate therebetween thereby restraining the feed plate from vertical movement, said fingers and at least the portion of the feed plate received therebetween lying generally perpendicular to the rear wall whereby the fingers readily disengage from the feed plate when the rear wall is swung to the second position.

5. A spreader apparatus for use on a vehicle having storage means for carrying a material to be spread and means for discharging the material therefrom, the spreader apparatus of the type having an elongated hopper mounted for receiving the material discharged from the storage means and including a front wall and a bottom wall connected thereto, at least one of said walls having a discharge opening therein intermediate the ends thereof, at least one auger mounted closely adjacent said walls for rotation about an axis lengthwise of the hopper, said auger having oppositely directed spiral flights thereon extending from the discharge opening toward opposite ends of the hopper for feeding material lengthwise of the hopper toward said discharge opening when rotated in one direction, the improvement comprising a feed plate spaced from the ends of the hopper and mounted above the discharge opening in close overlying relationship to the auger, said feed plate having a length greater than the length of the discharge opening and having one side connected to the front wall, a rear wall extending generally the full length of the hopper and pivotally connected to the bottom wall for movement from one position closely adjacent the auger and engaged with the feed plate to a second position removed therefrom to provide access for cleaning material from beneath the feed plate and auger, and means on the hopper for releasably supporting the rear wall in said one position.

6. A spreader apparatus as set forth in claim 5 wherein the rear wall has a generally channel-shaped cross-section to provide rigidity thereto with the flanges thereof extending rearwardly from the hopper, the bottom wall has a downwardly extending flange at its rear edge to provide rigidity therefor, and including a plurality of generally coaxial hinges each connected to said bottom wall flange and the lower rear wall flange to pivotally connect the rear wall to the bottom wall.

7. A spreader apparatus as set forth in claim 5 including means on the rear wall for engaging the feed plate when the rear wall is in said one position and for holding the feed plate in close overlying relationship to the auger.

8. A spreader apparatus as set forth in claim 7 including means for releasably mounting the feed plate on the front wall whereby the feed plate is removable when the rear wall is in said second position.

9. A spreader apparatus as set forth in claim 7 wherein the engaging means on the rear wall includes first and second pairs of vertically spaced fingers on the rear wall adjacent opposite ends of the feed plate for receiving the feed plate therebetween when the rear wall is in said one position thereby restraining the feed plate from vertical movement, said fingers and at least the portions of the feed plate received therebetween lying generally perpendicular to the rear wall whereby the fingers readily disengage from the feed plate when the rear wall is pivoted to the second position.

10. A spreader apparatus as set forth in claim 5 including a combination hopper cover and back plate dimensioned to extend completely across the top of the hopper between the front and rear walls thereof to cover the hopper in one position and movable to another position extending upwardly from the open top of the hopper adjacent the front of the rear wll, means on said hopper for releasably supporting said combination plate thereon in said other position to guide material discharged from the storage means into the hopper, said rear wall being movable to its second position when the combination plate is in said other position.

11. A spreader apparatus as set forth in claim 10 wherein the rear wall has a rearwardly extending flange adjacent its lower edge to provide rigidity for the rear wall, the bottom wall has a downwardly extending flange adjacent its rear edge to provide rigidity therefor, means connected to said flanges for pivotally connecting the rear wall to the bottom wall, and including at least one pair of vertically spaced fingers on the rear wall for receiving the rear edge of the feed plate therebetween and supporting the same, when the rear wall is in said one position, said fingers disposed generally perpendicular to the rear wall for ready removal from said supporting position when the rear wall is moved to said second position, and means for releasably mounting the feed plate on the front wall whereby the feed plate is removable when the rear wall is in said second position.

12. In a spreader apparatus for use with a vehicle-mounted dump box having a bottom and being generally open at the rear for discharge of a material therefrom; a trough mounted on the vehicle to extend along the rear end of the dump box to receive the material discharged therefrom; the trough having front and rear walls defining a generally open top and a bottom wall having a discharge opening for discharge of material from the trough; the front and rear walls being disposed at a level no higher than the bottom of the dump box; a combination trough cover and backplate dimensioned to extend between the front and rear walls to cover the trough in one position and allow the material to be dumped over the trough; said combination plate movable to another position extending upwardly from the top of the trough adjacent the rear wall to guide material from the dump box into the trough; auger means extending generally the full length of the trough for feeding the material through the discharge opening; and spreader means disposed below the discharge opening for spreading material received from the trough; the improvement comprising:

means releasably mounting the rear wall in one position adjacent the auger; said rear wall being movable from said one position to a second position removed therefrom for cleaning the trough and auger means; the rear wall being movable to its second position when the combination plate is in its said other position; a feed plate mounted above the discharge opening in close overlying relation to the auger means and extending between the front and rear walls; said feed plate being operative to confine the material advanced by the auger means whereby the auger means will force the material down through the discharge opening to the spreader means; first mounting means for connecting the feed plate to the front wall; and second mounting means on the rear wall for supporting the feed plate when the rear wall is in the one position and disengageable by the movement of the rear wall to the second position.

13. A spreader apparatus for use on a vehicle having a a dump box mounted thereon for carrying a material to be spread and for tilting movement about an axis extending crosswise of the vehicle, and said dump box having a bottom and being open at the rear end for discharge of the material therefrom, the spreader apparatus including: an open-topped hopper mounted on the vehicle to extend along the rear end of the dump box for receiving material therefrom and comprising a front wall, end walls, a bottom wall, and rear wall means rising upwardly from the bottom wall in one position to a level above the bottom of the dump box for guiding the material from the dump box into the hopper; the bottom wall having a discharge opening for the discharge of material from the hopper for spreading; auger means extending generally the full length of the hopper and rotatably mounted closely adjacent the walls for feeding the material downwardly through the discharge opening; at least the lower portion of the rear wall means being movable from said one position closely adjacent the auger means to a second position to provide a cleanout opening at the rear of the hopper, said cleanout opening extending downwardly substantially to the rear edge of the bottom wall and extending substantially the length of the hopper for cleaning the hopper and auger means, means on the hopper for supporting the rear wall means in said one position, and at least a portion of the rear wall means being movable to a position extending across the open top of the hopper to cover the same and allow the material in the dump box to be discharged therefrom over the top of the hopper.

14. A spreader apparatus for use on a vehicle having a dump box mounted thereon for carrying material to be spread and for tilting movement about an axis extending crosswise of the vehicle to said dump box being generally open at the rear for discharge of the material therefrom, the spreader apparatus including:

a trough mounted on the vehicle rearwardly of the dump box and at a level to receive the material discharged therefrom, said trough having front and rear walls and a bottom wall connected thereto and a discharge opening for discharge of material from the trough, auger means extending generally the full length of the trough and rotatably mounted closely adjacent said walls for feeding the material through the trough discharge opening, said rear wall being movable between one position closely adjacent the auger means and a second position removed therefrom for cleaning the trough and auger means, means on the trough for releasably supporting the rear wall in said one position, a combination trough cover and backplate dimensioned to extend between the front and rear walls to cover the trough in one position and allow the material to be dumped over the trough; and said combination plate movable to another position extending upwardly from the open top of the trough adjacent the rear wall to guide material from the dump box into the trough.

15. A hopper, for spreader apparatus for a vehicle having a dump box mounted on the vehicle for tilting movement, with an opening in the dump box for discharge of material therefrom, comprising
 a hopper body adapted for mounting on the vehicle below the opening in the dump box and having an inner wall, end walls and a bottom wall, with the bottom wall having an outer edge and a discharge opening in the bottom wall intermediate the end walls for the discharge of material from the hopper body for spreading,
 a cover plate having an inner edge and an underside and extending across the top of the hopper body in a covering position to cover the hopper body and permit material in the dump box to be discharged from the opening in the dump box over the top of the hopper body without passing through the hopper body, the cover plate being movable from the covering position to a backing position extending upwardly from the bottom wall of the hopper body to form an outer wall for the hopper body and to guide material from the dump box through the open top of the hopper body and into the hopper body, and the cover plate, when in the covering position, providing a cleanout opening extending the length of the hopper body above the outer edge of the bottom wall thereof for the removal of residual and jamming materials from the hopper body, and
 means for supporting the cover plate in the covering and backing positions and for effecting substantially material-tight communication between the bottom wall of the hopper body and the cover plate in the backing position.

16. The apparatus of claim 15, with the hopper body having material moving means mounted on the hopper body for moving material lengthwise of the hopper body toward the discharge opening.

17. The apparatus of claim 16 in which the material moving means is an auger mounted in the hopper body for rotation in a direction such that the upper circumference of the auger moves toward the rear.

18. In a spreader apparatus for mounting below the material discharge opening of a vehicle-mounted dump box, the combination of:
 a hopper body comprising an inner wall, end walls, a bottom wall having a discharge opening for the discharge of material from the hopper body for spreading, and rear wall means rising upwardly from the bottom wall in one position to a level above the bottom of the dump box for guiding the material from the dump box into the hopper body;
 at least a lower portion of the rear wall means being movable from said one position to a second position removed therefrom to provide a cleanout opening at the rear edge of the hopper, said cleanout opening extending downwardly to the bottom wall and extending generally the full length of the hopper body;
 at least an upper portion of the rear wall means being movable from said one position to a second covering position extending across the top of the hopper body to cover the same and permit material in the dump box to be discharged from the material discharge opening of the dump box over the top of the hopper body without passing through the hopper body; and
 means for supporting the rear wall means in said one position and for supporting at least the upper portion of the rear wall means in the covering position.

19. The spreader apparatus of claim 18 including an auger rotatably mounted in the hopper body below the top thereof, and means for rotating the auger in a direction such that the upper circumference of the auger moves toward the rear wall means to urge any larger pieces of material toward the rear wall means to urge any larger pieces of material toward the rear wall means.

20. The spreader apparatus of claim 18 wherein the upper and lower portions of the rear wall means are separate pieces and movable to their respective second positions independently of each other.

21. The spreader apparatus of claim 20 wherein the lower portion of the rear wall means is swingably mounted for movement between its said positions.

22. In a spreader apparatus for use on a vehicle having a tiltable dump box thereon for carrying a material to be spread and having a bottom and an opening above the bottom for discharge of material when the dump box is tilted; the spreader apparatus of the type having an open-topped hopper for receiving material discharged from the dump box opening, at least one auger in the hopper and mounted for rotation about an axis extending lengthwise of the hopper, and a broadcast spreader below the hopper for spreading the material discharged from the hopper; characterized in that the hopper includes:
 a rigid portion including spaced end walls having means for supporting the auger thereon, first wall means fixed to the end walls and having a front edge above the top of the auger and a rear edge disposed rearwardly of the auger and below the axis thereof, the first wall means extending from the front edge along the front and bottom sides of the auger in spaced relation thereto to the rear edge and having a discharge opening therein positioned intermediate the end walls and generally above the broadcast spreader, the rigid portion of the hopper being open at the rear side and defining a cleanout opening at the rear thereof extending generally the full length of the hopper above the rear edge of the first wall means and below the axis of the auger for cleaning the hopper beneath the auger; and
 a movable portion comprising back wall means for closing the cleanout opening in one position and extending from the rear edge of the first wall means in an upwardly direction and in spaced relation to the auger to a level above the front edge of the first wall means for guiding material into the hopper, means on the hopper for holding the back wall means in said one position, the back wall means being movable from the one position to uncover the cleanout opening above the rear edge of the first wall means and expose the back side of the auger for cleaning the hopper beneath the auger, and at least a portion of the back wall means being movable from the one position to a second position extending across the open top of the hopper to cover the same and allow material in the dump box to be discharged therefrom over the top of the hopper.

References Cited

UNITED STATES PATENTS

| | | | |
|---|---|---|---|
| Re. 25,709 | 1/1965 | Swenson et al. | 239—657 |
| 2,359,412 | 10/1944 | Flink | 239—657 |
| 2,967,056 | 1/1961 | D'Amato | 239—657 |
| 3,189,355 | 6/1965 | Swenson et al. | 239—657 |
| 3,229,983 | 1/1966 | Brammer | 239—657 |
| 3,349,970 | 10/1967 | Daneman | 222—166 |

EVERETT W. KIRBY, Primary Examiner

U.S. Cl. X.R.

239—675, 687

PO-1050
(5/69)

UNITED STATES PATENT OFFICE
CERTIFICATE OF CORRECTION

Patent No. 3,510,066   Dated May 5, 1970

Inventor(s) Eskil W. Swenson

It is certified that error appears in the above-identified patent and that said Letters Patent are hereby corrected as shown below:

Column 1, line 4 of the heading, "Lindenwood, Del." should be -- Lindenwood, Illinois --;

Column 7, line 35, "wll" should be -- wall --;

Column 8, line 53, after "vehicle" should be inserted a comma -- , -- and "to" should be omitted;

Column 10, line 5, the phrase "to urge any larger pieces of material toward the rear wall means" should be omitted.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents